United States Patent
Tamura et al.

(10) Patent No.: US 8,825,968 B2
(45) Date of Patent: Sep. 2, 2014

(54) INFORMATION PROCESSING APPARATUS AND STORAGE CONTROL METHOD

(75) Inventors: Masahisa Tamura, Kawasaki (JP);
Yasuo Noguchi, Kawasaki (JP);
Kazutaka Ogihara, Hachioji (JP);
Yoshihiro Tsuchiya, Yokohama (JP);
Takashi Watanabe, Kawasaki (JP);
Tatsuo Kumano, Kawasaki (JP);
Kazuichi Oe, Yokohama (JP); Toshihiro Ozawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 178 days.

(21) Appl. No.: 13/562,748

(22) Filed: Jul. 31, 2012

(65) Prior Publication Data
US 2013/0042082 A1 Feb. 14, 2013

(30) Foreign Application Priority Data
Aug. 12, 2011 (JP) ................................. 2011-176567

(51) Int. Cl.
*G06F 12/00* (2006.01)

(52) U.S. Cl.
CPC ...................................... *G06F 12/00* (2013.01)
USPC ........................................................ 711/154

(58) Field of Classification Search
CPC . G06F 3/065; G06F 11/1458; G06F 11/1471; G06F 11/184; G06F 11/2094
See application file for complete search history.

(56) References Cited

U.S. PATENT DOCUMENTS

| 7,308,545 | B1 * | 12/2007 | Kekre et al. .................... | 711/162 |
| 7,617,369 | B1 * | 11/2009 | Bezbaruah et al. ............ | 711/162 |
| 8,046,548 | B1 * | 10/2011 | Chatterjee et al. ............. | 711/162 |
| 8,589,732 | B2 * | 11/2013 | Krishnaprasad et al. ....... | 714/20 |
| 2003/0177321 | A1 | 9/2003 | Watanabe | |
| 2007/0067584 | A1 | 3/2007 | Muto | |
| 2010/0122051 | A1 | 5/2010 | Maki et al. | |

FOREIGN PATENT DOCUMENTS

| JP | 2004-272884 | 9/2004 |
| JP | 2007-86972 | 4/2007 |
| JP | 2010-113559 | 5/2010 |

* cited by examiner

*Primary Examiner* — Hiep Nguyen
(74) *Attorney, Agent, or Firm* — Staas & Halsey LLP

(57) ABSTRACT

An information processing apparatus includes a first storage unit and a processor. The first storage unit includes a first storage area. The processor receives a first request to write first data into the first storage area. The processor requests an external apparatus to write the first data into a second storage area in a second storage unit included in the external apparatus. The processor determines whether a first response has been received from the external apparatus. The first response indicates that the first data has been written into the second storage area. The processor writes the first data into the first storage area when the first response has been received. The processor requests, without writing the first data into the first storage area, the external apparatus to write second data stored in the first storage area into the second storage area when the first response has not been received.

6 Claims, 16 Drawing Sheets

INFORMATION PROCESSING APPARATUS AND STORAGE CONTROL METHOD

CROSS-REFERENCE TO RELATED APPLICATION

This application is based upon and claims the benefit of priority of the prior Japanese Patent Application No. 2011-176567, filed on Aug. 12, 2011, the entire contents of which are incorporated herein by reference.

FIELD

The embodiments discussed herein are related to an information processing apparatus and a storage control method.

BACKGROUND

Storage systems for storing data by using a storage device such as a hard disk drive (HDD) are used. Some of these storage systems include a plurality of physical nodes (also called storage nodes) at which storage devices are provided, and the storage nodes are connected to each other via a network. The storage node is, for example, a computer. Such a storage system may provide the redundancy of data so as to improve fault tolerance by storing the same data in different storage nodes. At that time, it is preferable that data stored in a certain storage node and corresponding data stored in another storage node be the same (be synchronized) after data updating.

A system that includes a local storage and a plurality of remote storages and synchronizes these storages with a time-stamped bitmap has been proposed. Furthermore, a system has been proposed in which a host usually writes data in both a main storage and a sub-storage, and, at the time of occurrence of a failure, a data update history (journal) is transmitted between these storages, not via the host, for the synchronization of the pieces of data. Still furthermore, a system has been proposed in which, when a plurality of logical volumes are copied between storages over a plurality of communication lines (physical paths), a management computer manages the relationship between a physical path and a logical volume and identifies the effect of a failure at a physical path.

Japanese Laid-open Patent Publication No. 2004-272884, Japanese Laid-open Patent Publication No. 2007-86972, and Japanese Laid-open Patent Publication No. 2010-113559 disclose related techniques.

SUMMARY

According to an aspect of the present invention, provided is an information processing apparatus including a first storage unit and a processor. The first storage unit includes a first storage area. The processor receives a first request to write first data into the first storage area. The processor requests an external apparatus to write the first data into a second storage area in a second storage unit included in the external apparatus. The second storage area corresponds to the first storage area. The processor determines whether a first response has been received from the external apparatus. The first response indicates that the first data has been written into the second storage area. The processor writes the first data into the first storage area when it is determined that the first response has been received from the external apparatus. The processor requests, without writing the first data into the first storage area, the external apparatus to write second data stored in the first storage area into the second storage area when it is determined that the first response has not been received from the external apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Here, a storage system will be considered in which, when a data writing (including overwriting) request is transmitted to a first storage node, data is written not only into the first storage node but also into a second storage node for the redundancy of the data. At that time, a method is considered in which the first storage node writes data into itself after checking that the data has been successfully written into the second storage node.

However, in a case where a failure occurs at a network between the storage nodes in the middle of a sequence of data writing, it is difficult for the first storage node to check whether the data has been successfully written into the second storage node. As a result, a data inconsistency may be generated between the first storage node and the second storage node. For example, a network failure may occur before the second storage node notifies the first storage node of the success of the writing of data into itself after receiving a data writing request from the first storage node. In this case, despite the fact that the data has been successfully written into the second storage node, the first storage node may determine that the writing of the data into the second storage node has failed because it does not receive a response from the second storage node.

Embodiments will be described below with reference to the accompanying drawings.

First Embodiment

Figure 1:
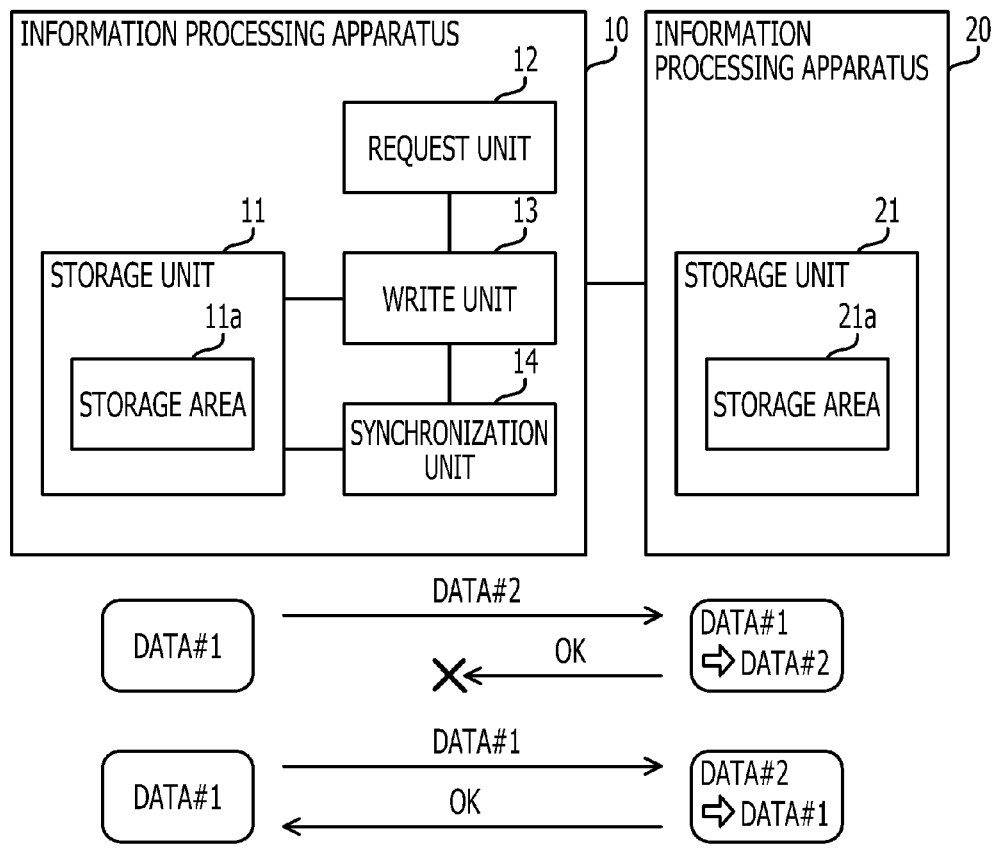
FIG. 1 is a diagram illustrating a storage system according to a first embodiment.

FIG. 1 is a diagram illustrating a storage system according to a first embodiment. A storage system according to the first embodiment includes information processing apparatuses 10 and 20. The information processing apparatuses 10 and 20 are connected to each other via a network. Each of the information processing apparatuses 10 and 20 may be a computer including a central processing unit (CPU) and a random access memory (RAM). The information processing apparatuses 10 and 20 may be called storage nodes.

The information processing apparatus 10 includes a storage unit 11, a request unit 12, a write unit 13, and a synchronization unit 14. The information processing apparatus 20 includes a storage unit 21. Each of the storage units 11 and 21 may be a volatile storage device such as a RAM or a nonvolatile storage device such as an HDD or a solid state drive (SSD). All or part of functions of the request unit 12, the write unit 13, and the synchronization unit 14 may be provided by a CPU executing a program stored in a RAM or by a circuit such as an application specific integrated circuit (ASIC).

The storage units 11 and 21 store data. The storage unit 11 includes a storage area 11a. The storage unit 21 includes a storage area 21a corresponding to the storage area 11a of the storage unit 11. For example, the same address is assigned to the storage areas 11a and 21a in the corresponding storage units. For example, when data consistency is maintained between the information processing apparatuses 10 and 20, identical data is stored in the storage areas 11a and 21a.

Upon receiving a writing request to write data into the storage area 11a, the request unit 12 requests the information processing apparatus 20 to perform data writing. For example, the writing request to write data into the storage area 11a is received from another information processing apparatus such as a client computer (not illustrated) via a network. The received writing request includes, for example, data to be written into the storage area 11a, an offset representing the start position of the storage area 11a, and information about a data size. The data writing request transmitted to the information processing apparatus 20 includes, for example, the data included in the received writing request, an offset representing the start position of the storage area 21a (that may be the same as the offset of the storage area 11a), and information about a data size.

Upon receiving the data writing request from the information processing apparatus 10, the information processing apparatus 20 writes the data into the storage area 21a corresponding to the storage area 11a and notifies the information processing apparatus 10 that data writing has been successfully performed. In the middle of a sequence of data writing, a network failure may occur. In a case where a network failure has already occurred before the information processing apparatus 10 transmits a data writing request, the data writing request does not reach the information processing apparatus 20 and no data is written into the storage area 21a. On the other hand, in a case where a network failure occurs after the information processing apparatus 10 has transmitted a data writing request, the data writing request may reach the information processing apparatus 20 and data may be written into the storage area 21a. In this case, however, a response from the information processing apparatus 20 may not reach the information processing apparatus 10.

The write unit 13 waits for a response from the information processing apparatus 20 after the request unit 12 has requested the information processing apparatus 20 to perform data writing. Upon detecting that data has been successfully written into the storage area 21a on the basis of the response from the information processing apparatus 20, the write unit 13 writes the data into the storage area 11a in response to the received writing request. In a case where there is no response from the information processing apparatus 20 (for example, there is no response within a predetermined period after the request unit 12 has transmitted the data writing request), the write unit 13 writes no data into the storage area 11a.

In a case where there is no response from the information processing apparatus 20, the synchronization unit 14 reads out data from the storage area 11a on which writing has not been performed and transmits a data writing request to the information processing apparatus 20. The data writing request transmitted to the information processing apparatus 20 includes the data read out from the storage area 11a, an offset representing the start position of the storage area 21a (that may be the same as the offset of the storage area 11a), and information about a data size. In a case where the network has already been recovered at the time of transmission of the data writing request performed by the synchronization unit 14, the data writing request reaches the information processing apparatus 20 and the data stored in the storage area 11a is written into the storage area 21a.

The synchronization unit 14 may perform the process for transmitting data stored in the storage area 11a to the information processing apparatus 20 so as to synchronize the storage areas 11a and 21a when the information processing apparatus 10 receives another data writing request. The synchronization unit 14 may perform the synchronization process when the information processing apparatus 10 receives one of another data reading request and another data writing request. Alternatively, the synchronization unit 14 may periodically check whether there is a storage area on which data writing has not been performed because of the absence of a response from the information processing apparatus 20 and perform the synchronization process when there is such a storage area. In a case where the network has not yet been recovered and the synchronization process fails, the synchronization unit 14 may repeatedly perform the synchronization process until it succeeds.

For example, it is assumed that data #1 is stored in the storage areas 11a and 21a. Upon receiving a writing request to write data #2 in the storage area 11a, the information processing apparatus 10 transmits the data #2 to the information processing apparatus 20. The information processing apparatus 20 changes data stored in the storage area 21a from the data #1 to the data #2. At that time, it is assumed that a failure has occurred at a network between the information processing apparatuses 10 and 20. The information processing apparatus 10 does not receive from the information processing apparatus 20 a response indicating that data writing has been successfully performed and does not write the data #2 into the storage area 11a.

As a result, the consistency between data stored in the storage area 11a and data stored in the storage area 21a is lost. Accordingly, the information processing apparatus 10 waits for another writing request or the next periodic timing and starts the synchronization process. The information processing apparatus 10 reads out the data #1 from the storage area 11a and transmits the data #1 to the information processing apparatus 20. At that time, it is assumed that the network between the information processing apparatuses 10 and 20 has already been recovered. In this case, the information processing apparatus 20 changes data stored in the storage area 21a from the data #2 to the received data #1. As a result, the consistency between data stored in the storage area 11a and data stored in the storage area 21a is obtained again.

The information processing apparatus 10 may be set as a primary node for receiving a data reading request and a data writing request, and the information processing apparatus 20 may be set as a secondary node for storing backup data. Each of the storage areas of the storage units 11 and 21 may be divided into a plurality of segments. For each of these segments, one of the information processing apparatuses 10 and 20 may be selected as a primary node and the other one of them may be selected as a secondary node. In this case, the information processing apparatus 20 includes function modules similar to the request unit 12, the write unit 13, and the synchronization unit 14 to receive a writing request and perform synchronization process for a part of the segments included therein.

Upon receiving a request to write data into the storage area 11a of the storage unit 11, the information processing apparatus 10 according to the first embodiment transmits a data writing request to the information processing apparatus 20. Upon detecting that the data has been successfully written into the storage area 21a of the storage unit 21 on the basis of a response from the information processing apparatus 20, the information processing apparatus 10 according to the first embodiment writes the data into the storage area 11a. On the other hand, in a case where there is no response from the information processing apparatus 20, the information processing apparatus 10 according to the first embodiment writes no data into the storage area 11a, and then transmits data stored in the storage area 11a to the information processing apparatus 20 so as to cause the information processing apparatus 20 to write the data into the storage area 21a.

As a result, even in a case where a response from the information processing apparatus 20 does not reach the information processing apparatus 10 because of a network failure and the consistency between data stored in the storage area 11a and data stored in the storage area 21a is lost, the consistency may be obtained again. As compared with a method of causing the information processing apparatus 10 to retransmit the data to the information processing apparatus 20 immediately after detecting that there has been no response from the information processing apparatus 20, for example, this method of causing the information processing apparatus 10 to wait for another data writing request and perform synchronization process after receiving another data writing request raises the probability of success in performing synchronization after the network has been recovered.

In a case where a response from the information processing apparatus 20 does not reach the information processing apparatus 10, data may not be written into the storage area 21a and the data consistency may not be lost. However, since the information processing apparatus 10 does not receive a response from the information processing apparatus 20, it is difficult for the information processing apparatus 10 to accurately determine whether data consistency has been lost or not. Accordingly, in this case in which the information processing apparatus 10 receives no response, it is preferable to perform synchronization process.

Second Embodiment

Figure 2:
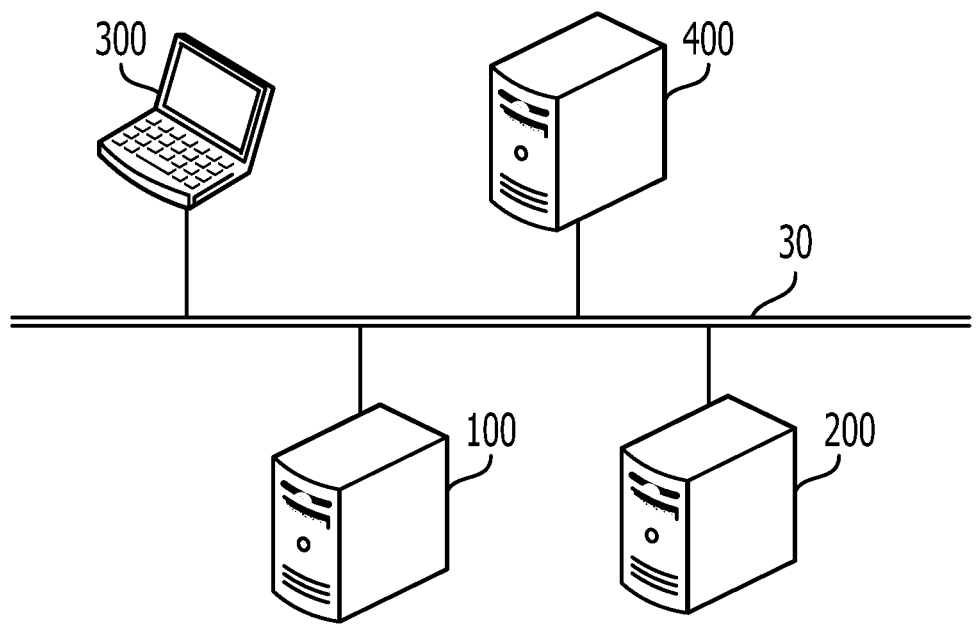
FIG. 2 is a diagram illustrating a storage system according to a second embodiment.

FIG. 2 is a diagram illustrating a storage system according to a second embodiment. A storage system according to the second embodiment includes storage nodes 100 and 200, a client node 300, and a control node 400. These nodes are connected to a network 30. The network 30 may include a wired or wireless local area network (LAN).

The storage nodes 100 and 200 are server computers for storing data in a nonvolatile storage device. The same data is stored in both the storage nodes 100 and 200, so that the redundancy of the data is provided. One of the storage nodes 100 and 200 is set as a primary node, and the other one of them is set as a secondary node. For example, the storage node 100 is the primary node, and the storage node 200 is the secondary node. The primary node receives access from the client node 300. The secondary node stores backup data. Data reading is performed on the primary node, and data writing is performed on both the primary node and the secondary node.

The client node 300 is a computer that uses data stored in the storage nodes 100 and 200. The client node 300 may be a terminal apparatus operated by a user or a server apparatus. The client node 300 accesses one of the storage nodes 100 and 200 which is set as the primary node. The client node 300 may make an inquiry about which of the storage nodes 100 and 200 is the primary node to the control node 400. The access may be a data reading request (reading request) or a data writing request (writing request). Each of the reading request and the writing request includes an offset representing the start position of a storage area and information about a data size. The writing request further includes data to be written into the storage area.

The control node 400 is a computer for managing the storage nodes 100 and 200. The control node 400 may be a terminal apparatus or a server apparatus. The control node 400 selects one of the storage nodes 100 and 200 as the primary node, and instructs the selected one of them and the other one of them to operate as the primary node and the secondary node, respectively. The control node 400 determines to exchange the primary node and the secondary node in accordance with a user's operation or a predetermined exchange algorithm, and transmits an exchange instruction to the storage nodes 100 and 200.

The storage node 100 is an example of the information processing apparatus 10 according to the first embodiment. The storage node 200 is an example of the information processing apparatus 20 according to the first embodiment.

Figure 3:
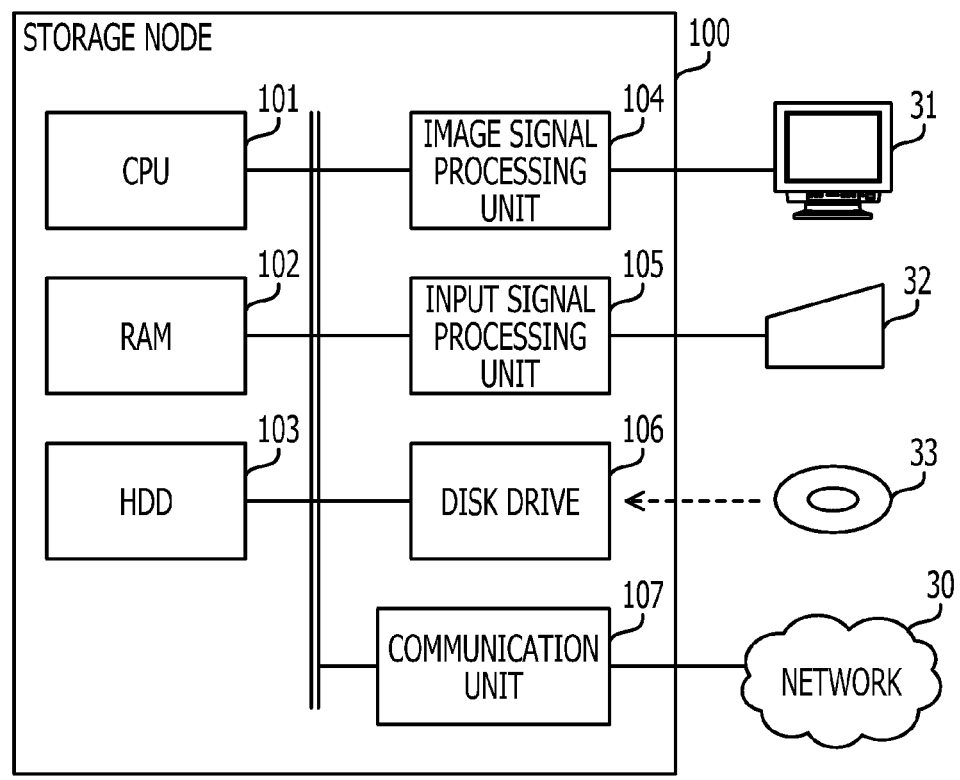
FIG. 3 is a block diagram illustrating an exemplary hardware configuration of a storage node.

FIG. 3 is a block diagram illustrating an exemplary hardware configuration of a storage node. The storage node 100 includes a CPU 101, a RAM 102, an HDD 103, an image signal processing unit 104, an input signal processing unit 105, a disk drive 106, and a communication unit 107. These units are connected to a bus of the storage node 100. The storage node 200, the client node 300, and the control node 400 may have a hardware configuration similar to that of the storage node 100 illustrated in FIG. 3.

The CPU 101 is an arithmetic unit (processor) for controlling information processing in the storage node 100. The CPU 101 reads out at least a part of a program or data stored in the HDD 103, expands the read program or data it onto the RAM 102, and executes the expanded program. The storage node 100 may include a plurality of arithmetic units so as to cause the arithmetic units to perform information processing in a distributed manner.

The RAM 102 is a volatile memory for temporarily storing a program to be executed by the CPU 101 or data. The storage node 100 may include another type of memory other than the RAM and may include a plurality of memories.

The HDD 103 is a nonvolatile storage device for storing programs such as an operating system (OS) program and an application program and data. The HDD 103 reads out or writes data from or into a magnetic disk included therein in accordance with an instruction made by the CPU 101. The storage node 100 may include another type of nonvolatile storage device (for example, an SSD) other than the HDD and may include a plurality of storage devices.

The image signal processing unit 104 outputs an image to a display device 31 connected to the storage node 100 in accordance with an instruction made by the CPU 101. The display device 31 is, for example, a cathode ray tube (CRT) display or a liquid crystal display.

The input signal processing unit 105 acquires an input signal from an input device 32 connected to the storage node 100 and outputs the input signal to the CPU 101. The input device 32 is, for example, a keyboard or a pointing device such as a mouse or a touch panel.

The disk drive 106 is a driving apparatus for reading out a program or data stored in a recording medium 33. The recording medium 33 is, for example, a magnetic disk such as a flexible disk (FD) or an HDD, an optical disc such as a compact disc (CD) or a digital versatile disc (DVD), or a magneto-optical disk (MO). For example, the disk drive 106 stores a program or data read out from the recording medium 33 in the RAM 102 or the HDD 103 in accordance with an instruction made by the CPU 101.

The communication unit 107 is a communication interface for communicating with the storage node 200, the client node 300, and the control node 400 via the network 30. The communication unit 107 may be a wired communication interface or a wireless communication interface.

Figure 4:
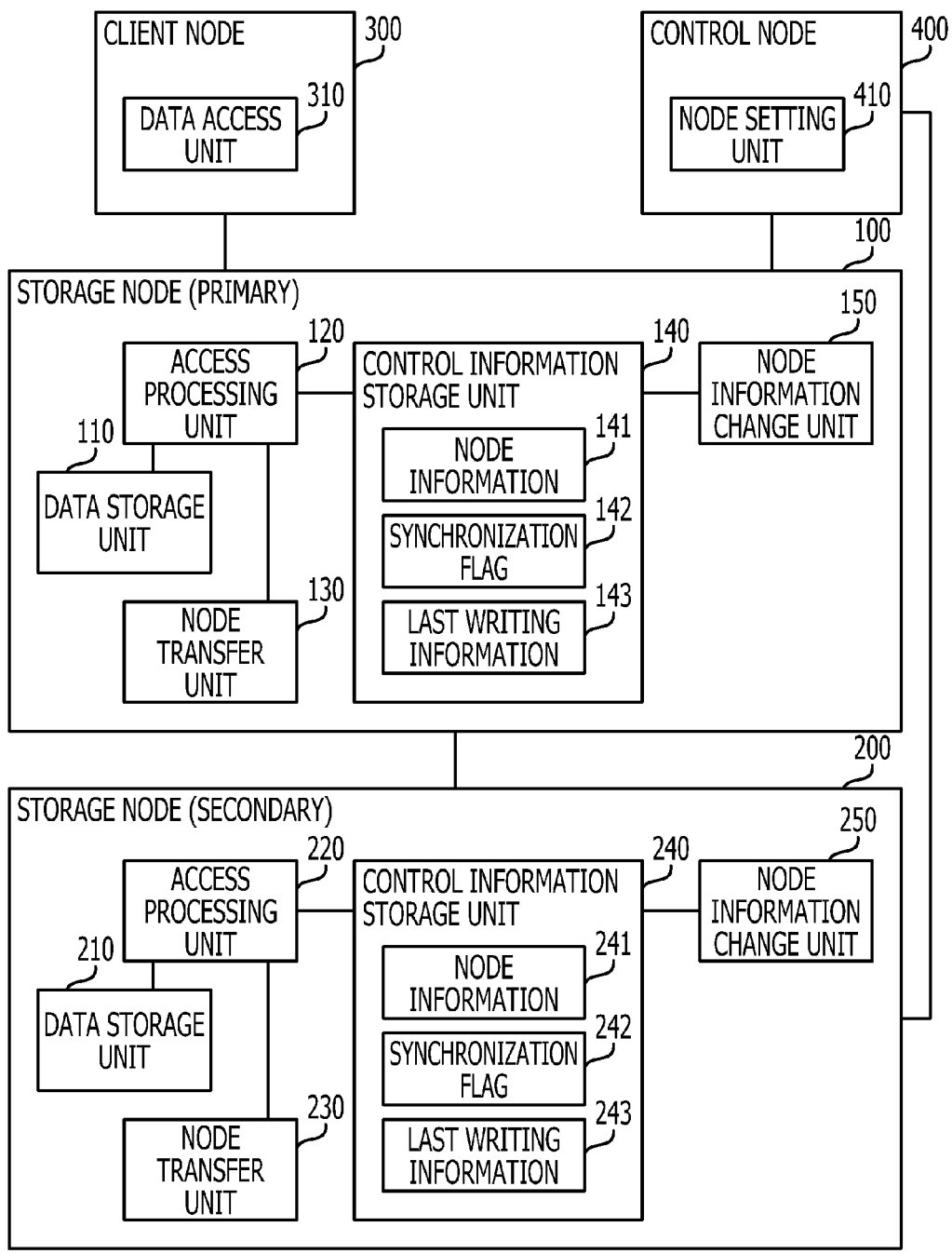
FIG. 4 is a block diagram illustrating an example of a functional configuration of a storage system according to a second embodiment.

FIG. 4 is a block diagram illustrating an example of a functional configuration of a storage system according to the second embodiment.

The storage node 100 includes a data storage unit 110, an access processing unit 120, a node transfer unit 130, a control information storage unit 140, and a node information change unit 150. The storage node 200 includes a data storage unit 210, an access processing unit 220, a node transfer unit 230, a control information storage unit 240, and a node information change unit 250.

The data storage units 110 and 210 store data. The data storage units 110 and 210 are RAMs or HDDs, for example. A storage area for data may be specified with an offset representing the start position of the storage area (an address distance from a predetermined position) and the size of the storage area. The start position may be specified with a physical or logical address. Instead of the size, an address representing the end position of the storage area may be used. In a case where there is synchronization between the data storage units 110 and 210, the same data is stored in the data storage units 110 and 210. The same data is preferably stored in storage areas specified with the same offset and the same size.

The access processing units 120 and 220 receive access (a reading request or a writing request) to data. Each of the reading request and the writing request includes information on an offset and a size. The writing request further includes data to be written. An access processing unit (for example the access processing unit 120) included in the primary node receives access from the client node 300. An access processing unit (for example the access processing unit 220) included in the secondary node receives access transferred from the primary node.

Each of the access processing units 120 and 220 reads out or writes data from or into the data storage unit included in a corresponding node in accordance with the received access and transmits a response to the source of the access. The response to the reading request includes data that has been read out. The response to the writing request includes information about the success (OK) or failure (NG) of data writing. Upon receiving a writing request, the access processing unit included in the primary node causes the secondary node to perform data writing and writes data therein after checking that data writing has been successfully performed in the secondary node.

In preparation for the data inconsistency between the data storage units 110 and 210 because of a failure at the network 30, each of the access processing units 120 and 220 writes control information, which will be described later, in the control information storage unit included in a corresponding node at the time of processing the writing request. In a case where there is a possibility that the data consistency between the data storage units 110 and 210 has been lost, the access processing unit (for example the access processing unit 120) included in the primary node controls synchronization process for synchronizing the secondary node with the primary node.

When included in the primary node, each of the node transfer units 130 and 230 transfers a writing request received from the client node 300 to the secondary node, monitors whether a response to the writing request has been received from the secondary node within a predetermined period after transferring the writing request, and notifies the access processing unit included in the primary node of the success or failure of the writing or the occurrence of a timeout.

The control information storage units 140 and 240 store pieces of control information used to control the storage nodes 100 and 200, respectively. A piece of control information stored in the control information storage unit 140 includes node information 141, a synchronization flag 142, and last writing information 143. A piece of control information stored in the control information storage unit 240 includes node information 241, a synchronization flag 242, and last writing information 243.

Each of the pieces of node information 141 and 241 indicates the type (the primary node or the secondary node) of a corresponding node. The synchronization flag 142 indicates whether the synchronization of the data storage unit 210 with the data storage unit 110 has been checked. The synchronization flag 242 indicates whether the synchronization of the data storage unit 110 with the data storage unit 210 has been checked. Each of the synchronization flags 142 and 242 indicates one of three states: unset (no flag value), synchronized (flag ON), and desynchronized (flag OFF). Upon receiving a response indicating the success of writing from the secondary node, the primary node sets the status of the synchronization flag thereof (for example the synchronization flag 142) to "synchronized". On the other hand, in a case where there is no response, the primary node sets the status of the synchronization flag thereof to "desynchronized". Each of the pieces of last writing information 143 and 243 indicates a storage area specified by the last writing request, and includes information on the offset and the size.

Each of the node information change units 150 and 250 updates information stored in the control information storage unit included in a corresponding node in accordance with an instruction made by the control node 400. Upon receiving a primary node change instruction, each of the node information change units 150 and 250 changes the type of a corresponding node from the primary node to the secondary node or from the secondary node to the primary node.

The client node 300 includes a data access unit 310. The data access unit 310 transmits a reading request and a writing request to one of the storage nodes 100 and 200, which is set as the primary node. Upon transmitting a reading request, the data access unit 310 receives a response including data from the primary node. Upon transmitting a writing request, the data access unit 310 receives a response indicating the success or failure of writing from the primary node. In a case where it is difficult for the data access unit 310 to determine which of the storage nodes 100 and 200 is the primary node, the data access unit 310 may make an inquiry to the control node 400.

The control node 400 includes a node setting unit 410. The node setting unit 410 transmits a setting change request to the storage nodes 100 and 200 in accordance with a user's operation or a predetermined algorithm. For example, the control node 400 transmits a primary node change instruction to the storage nodes 100 and 200.

The data storage units 110 and 210 are examples of the storage units 11 and 21 according to the first embodiment, respectively. The access processing unit 120 is an example of the write unit 13 according to the first embodiment. The node transfer unit 130 is an example of the request unit 12 and the synchronization unit 14 according to the first embodiment.

Figure 5:
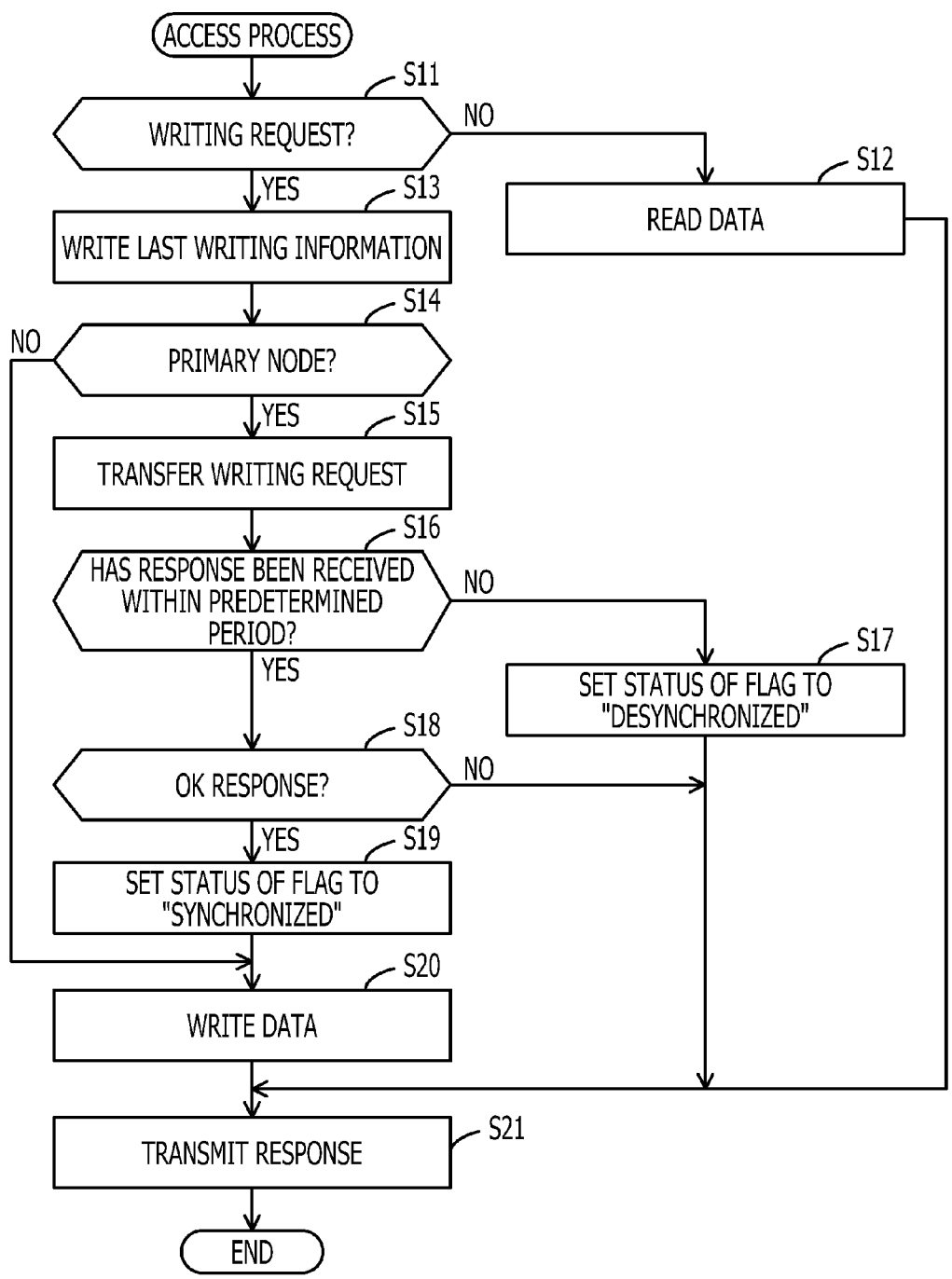
FIG. 5 is a flowchart illustrating an example of an access process.

FIG. 5 is a flowchart illustrating an example of an access process. The process illustrated in FIG. 5 is performed each time the storage nodes 100 and 200 receive access. The process will be described below under the assumption that the storage node 100 performs the process illustrated in FIG. 5.

(S11) Upon receiving access, the access processing unit 120 determines whether the access is a writing request. In a case where the access is a writing request, the process proceeds to S13. In a case where the access is not a writing request (in a case where the access is a reading request), the process proceeds to S12.

(S12) The access processing unit 120 reads out data from a storage area in the data storage unit 110, which is specified by information on an offset and a size included in the reading request. The process proceeds to S21.

(S13) The access processing unit 120 writes the information on the offset and the size included in the writing request into the control information storage unit 140 as the last writing information 143.

(S14) The access processing unit 120 determines whether a node to which it belongs is the primary node, for example, by referring to the node information 141 stored in the control information storage unit 140. In a case where the node to which the access processing unit 120 belongs is the primary node, the process proceeds to S15. In a case where the node to which the access processing unit 120 belongs is the secondary node, the process proceeds to S20.

(S15) The access processing unit 120 instructs the node transfer unit 130 to transfer the writing request. The node transfer unit 130 transfers the writing request received by the access processing unit 120 to the storage node 200 that is the secondary node.

(S16) The node transfer unit 130 determines whether a response from the secondary node has been received within a predetermined period after transferring the writing request. The node transfer unit 130 may use a software timer or a hardware timer so as to detect a timeout. In a case where a response has been received within the predetermined period (no timeout has occurred), the process proceeds to S18. In a case where no response has been received within the predetermined period (a timeout has occurred), the process proceeds to S17.

(S17) The node transfer unit 130 notifies the access processing unit 120 of the occurrence of a timeout. The access processing unit 120 sets the status of the synchronization flag 142 stored in the control information storage unit 140 to "desynchronized". The process proceeds to S21.

(S18) The node transfer unit 130 determines whether the response received from the secondary node indicates that writing has been successfully performed (OK). In a case where writing has been successfully performed, the process proceeds to S19. In a case where writing has failed (NG), the process proceeds to S21.

(S19) The node transfer unit 130 notifies the access processing unit 120 of the success of the writing. The access processing unit 120 sets the status of the synchronization flag 142 to "synchronized".

(S20) The access processing unit 120 writes data included in the writing request received in S11 in a storage area in the data storage unit 110, which is specified by the information on the offset and the size included in the writing request.

(S21) The access processing unit 120 transmits a response to the source of the access. In a case where the access processing unit 120 reads out data from the data storage unit 110 (S12), the access processing unit 120 transmits a response including the read data. In a case where data has been successfully written into the data storage unit 110 (S20), the access processing unit 120 transmits a response indicating the success of the writing. In other cases, the access processing unit 120 transmits a response indicating the failure of the writing.

Figure 6:
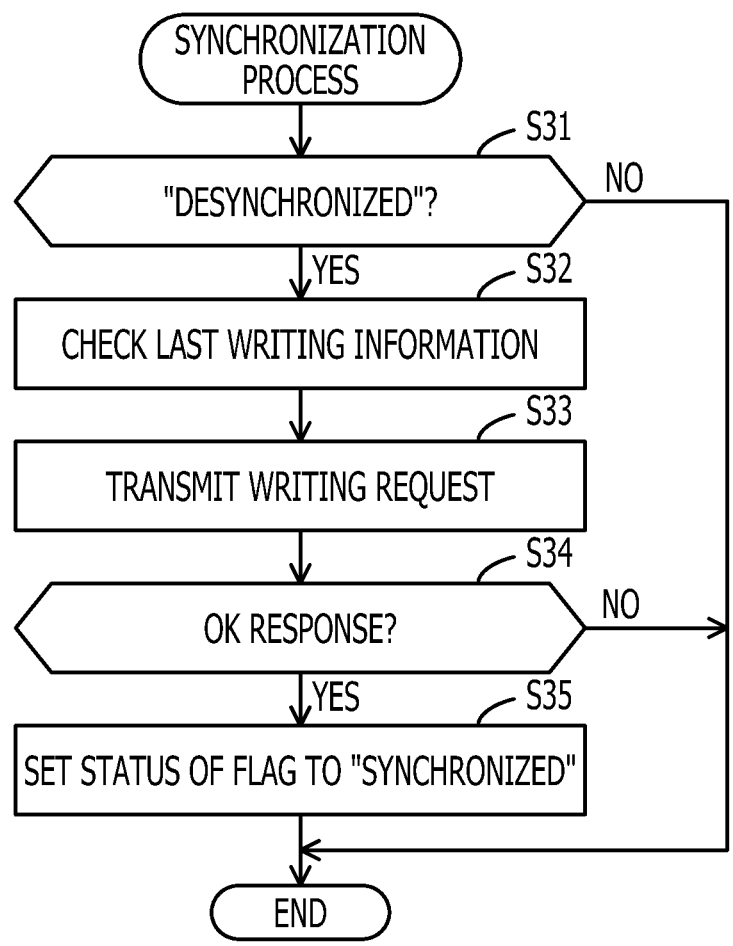
FIG. 6 is a flowchart illustrating an example of a synchronization process.

FIG. 6 is a flowchart illustrating an example of a synchronization process. The process illustrated in FIG. 6 is performed before the process illustrated in FIG. 5 each time the primary node receives access (a reading request or a writing request) from the client node 300. The process illustrated in FIG. 6 will be described below under the assumption that the storage node 100 is the primary node.

(S31) Upon receiving access from the client node 300, the access processing unit 120 checks the synchronization flag 142 stored in the control information storage unit 140. In a case where the status of the synchronization flag 142 is "desynchronized", the process proceeds to S32. In other cases, the synchronization process ends and the access process illustrated in FIG. 5 is performed.

(S32) The access processing unit 120 checks an offset and a size specified by the last writing request on the basis of the last writing information 143 stored in the control information storage unit 140.

(S33) The access processing unit 120 reads out data from a storage area in the data storage unit 110, specified by the offset and the size checked in S32. The node transfer unit 130 transmits a writing request to the storage node 200 that is the secondary node. This writing request includes the data read by the access processing unit 120 and the information on the offset and the size, which specifies the storage area for storing the data.

(S34) The node transfer unit 130 determines whether a response indicating the success of writing has been received from the secondary node within a predetermined period after transmitting the writing request. In a case where a response indicating the success of writing has been received, the process proceeds to S35. In a case where a response indicating the failure of writing has been received or no response has been received within the predetermined period, the synchronization process ends. In a case where the synchronization fails, the access process illustrated in FIG. 5 is not performed and a response indicating the failure of access is transmitted to the client node 300.

(S35) The node transfer unit 130 notifies the access processing unit 120 of the success of writing. The access processing unit 120 sets the status of the synchronization flag 142 to "synchronized". Subsequently, the access process illustrated in FIG. 5 is performed.

Thus, in a case where a response from the storage node 200 does not reach the storage node 100 because of a network failure, the storage node 100 determines that the synchronization between the data storage units 110 and 210 is not achieved. Upon receiving the next access (a reading request or a writing request), the storage node 100 tries to synchronize the data storage unit 210 with the data storage unit 110.

In a case where the writing request to which no response has been received from the storage node 200 and the next writing request are requests for writing of data into the same storage area, the storage node 100 does not necessarily have to perform the synchronization process.

Figure 7:
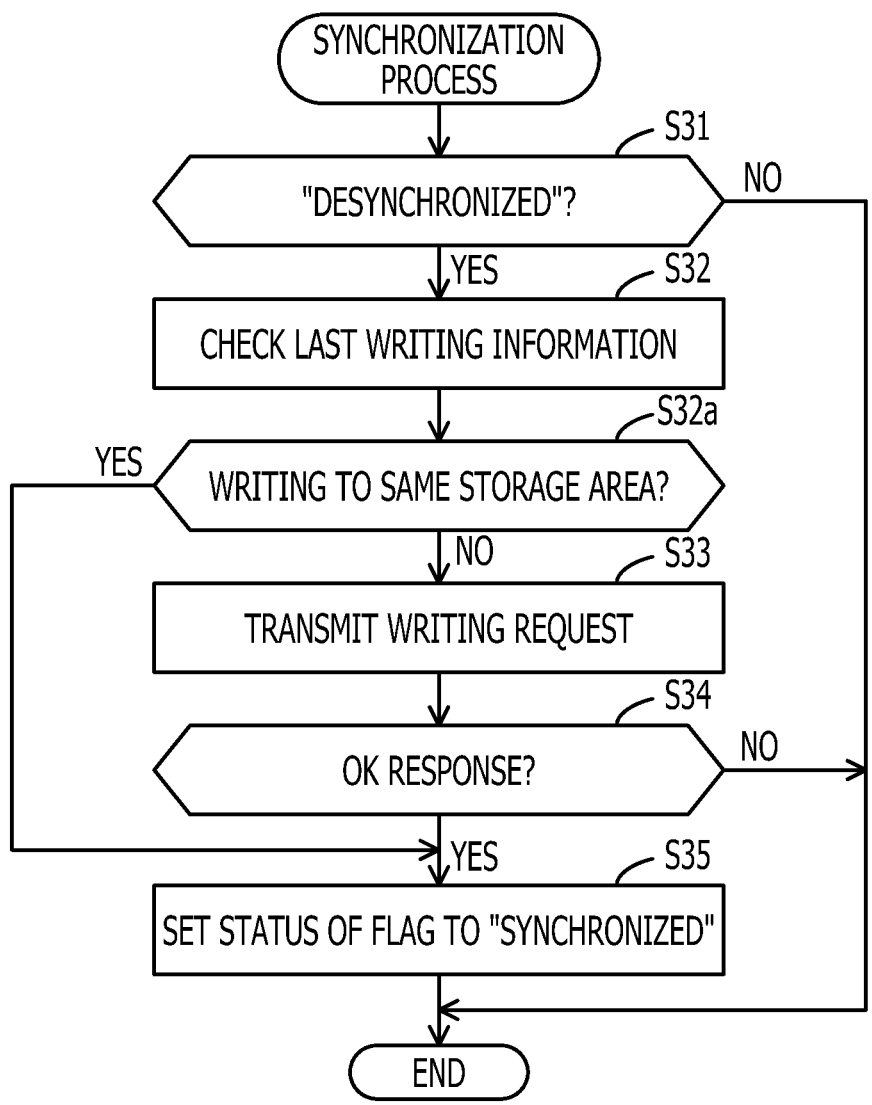
FIG. 7 is a flowchart illustrating another example of a synchronization process.

FIG. 7 is a flowchart illustrating another example of a synchronization process. In the synchronization process illustrated in FIG. 7, S32*a* to be described below is performed between S32 and S33 illustrated in FIG. 6.

(S32*a*) The access processing unit 120 determines whether the access received in S31 is a writing request and an offset and a size specified by this writing request are the same as those indicated by the last writing information 143. In a case where this condition is satisfied, the process proceeds to S35. In a case where this condition is not satisfied, the process proceeds to S33.

In a case where a certain writing request and the next writing request specify the same storage area, the data written into the storage node 200 in the synchronization process is overwritten at the time of the next writing request. Accordingly, as illustrated in FIG. 7, in a case where the same storage area is specified as a writing target storage area, the storage node 100 may omit copying of data from the data storage unit 110 to the data storage unit 210.

Figure 8:
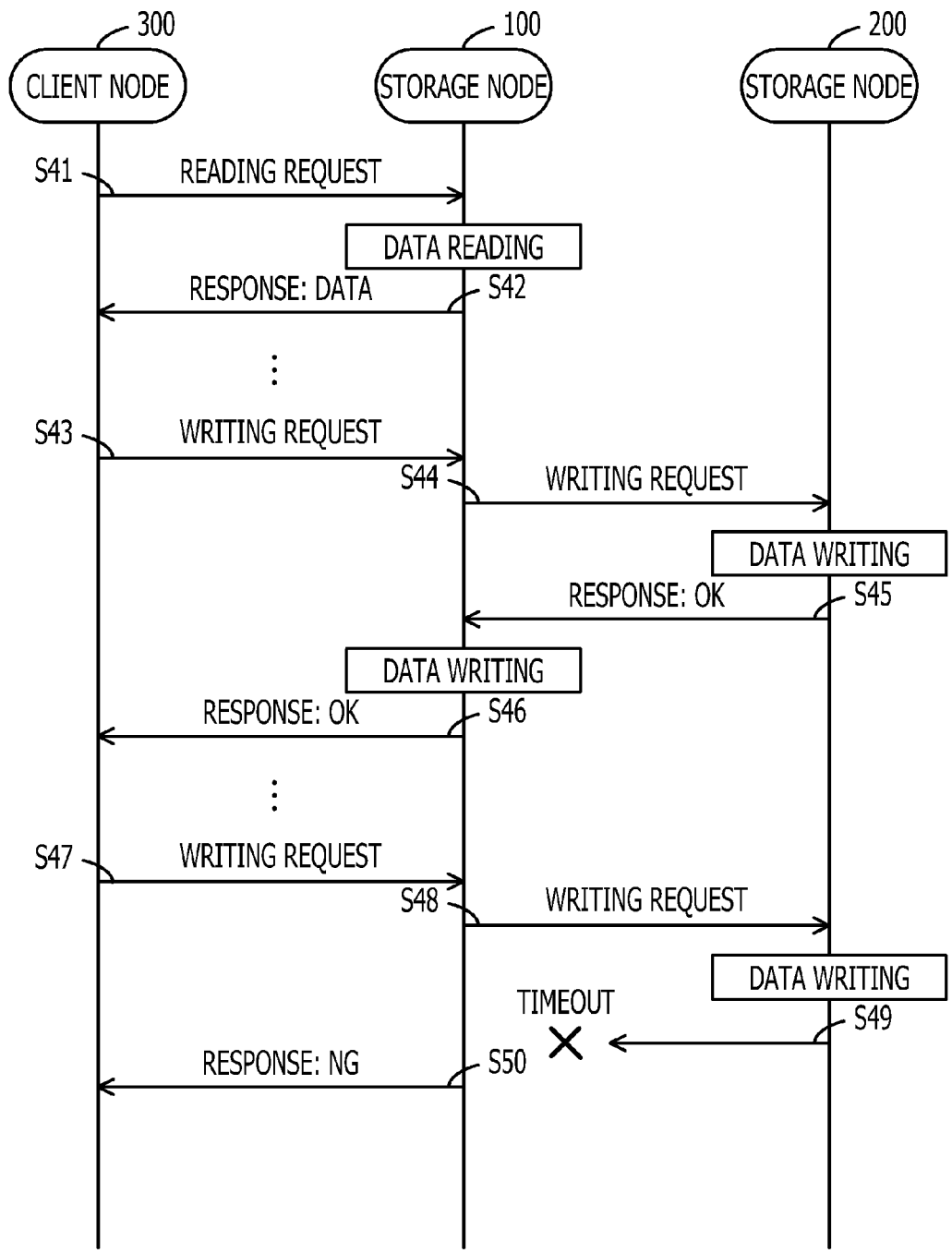
FIG. 8 is a diagram illustrating an exemplary sequence of data access.

FIG. 8 is a diagram illustrating an exemplary sequence of data access. The sequence illustrated in FIG. 8 will be described below under the assumption that the storage node 100 is the primary node.

(S41) The client node 300 transmits a reading request including information on an offset and a size for specifying a storage area to the storage node 100.

(S42) The storage node 100 reads out data from the storage area in the data storage unit 110, which is specified by the reading request, and transmits a response including the read data to the client node 300.

(S43) The client node 300 transmits a writing request including information on an offset and a size for specifying a storage area to the storage node 100.

(S44) The storage node 100 writes the last writing information 143 representing the storage area specified by the writing request into the control information storage unit 140. Furthermore, the storage node 100 transfers the writing request to the storage node 200.

(S45) The storage node 200 writes the last writing information 243 representing the storage area specified by the writing request into the control information storage unit 240. The storage node 200 writes data into the storage area in the data storage unit 210, which is specified by the writing request. The storage node 200 checks that the writing has been successfully performed and transmits a response indicating the success of writing to the storage node 100.

(S46) The storage node 100 sets the status of the synchronization flag 142 to "synchronized", writes data into the storage area in the data storage unit 110, which is specified by the writing request, and transmits a response indicating the success of writing to the client node 300.

(S47) The client node 300 transmits a writing request including information on an offset and a size for specifying a storage area to the storage node 100.

(S48) The storage node 100 writes the last writing information 143 representing a storage area specified by the writing request into the control information storage unit 140. Furthermore, the storage node 100 transfers the writing request to the storage node 200.

(S49) The storage node 200 writes the last writing information 243 representing a storage area specified by the writing request into the control information storage unit 240. The storage node 200 writes data into the storage area in the data storage unit 210, which is specified by the writing request. The storage node 200 checks that the data has been successfully written and transmits a response indicating the success of writing to the storage node 100. However, a failure occurs at the network 30 and the response does not reach the storage node 100.

(S50) The storage node 100 detects a response timeout, writes no data into the data storage unit 110, sets the status of the synchronization flag 142 to "desynchronized", and transmits a response indicating the failure of writing to the client node 300.

Figure 9:
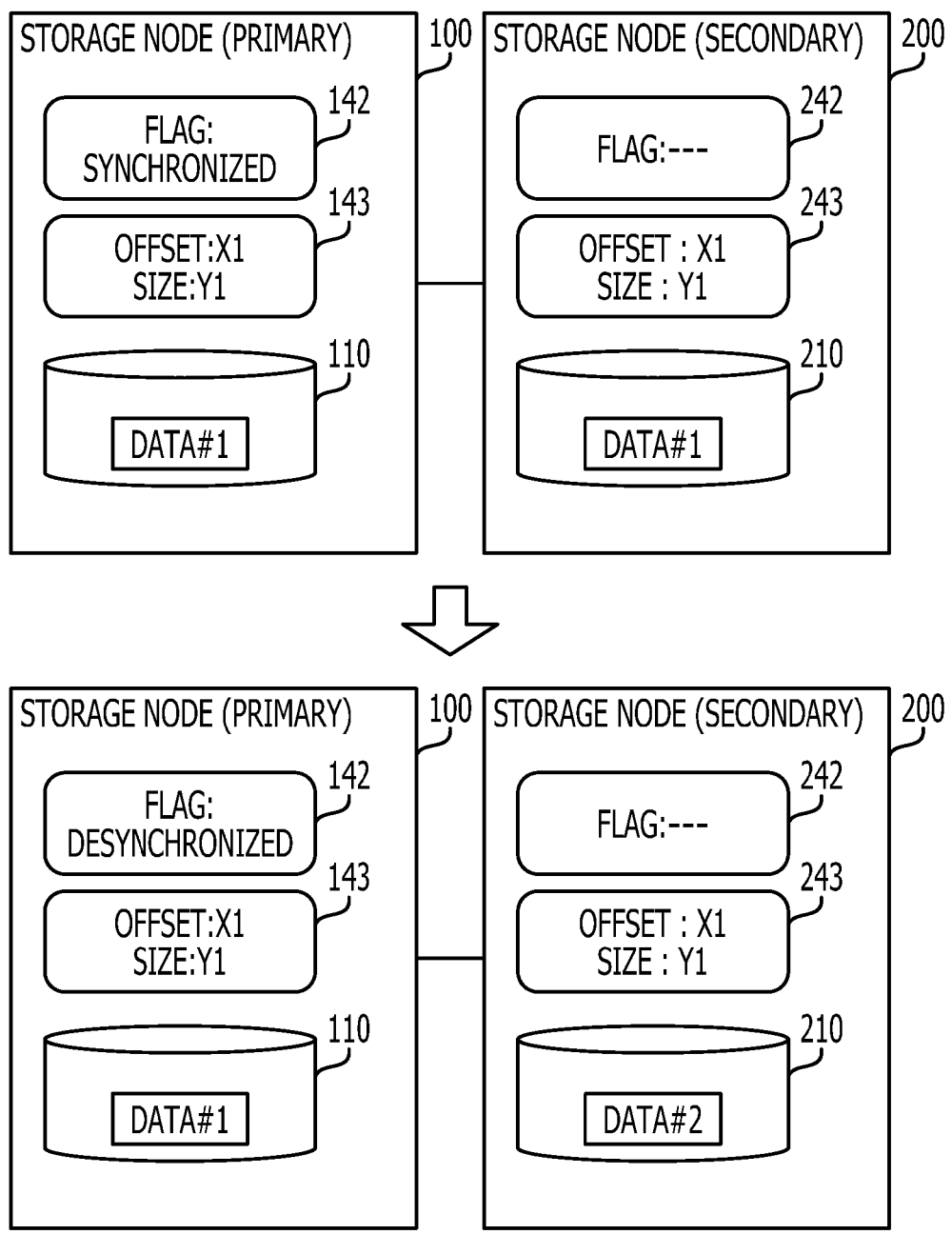
FIG. 9 is a diagram illustrating a first example of change in synchronization state.

FIG. 9 is a diagram illustrating a first example of change in synchronization state. The upper part of FIG. 9 represents the states of the storage nodes 100 and 200 after the processing of S46 has been performed. The lower part of FIG. 9 represents the states of the storage nodes 100 and 200 after the processing of S50 has been performed.

After the processing of S46 has been performed, the status of the synchronization flag 142 is set to "synchronized" in the storage node 100. The last writing information 143 indicates offset=X1 and size=Y1 which have been specified by the writing request obtained in S43. In the storage area in the data storage unit 110, which is specified by the last writing information 143, data #1 is written. In the storage node 200, the synchronization flag 242 has no value. The last writing information 243 indicates offset=X1 and size=Y1 which are the same as those indicated by the last writing information 143. In the storage area in the data storage unit 210, which is specified by the last writing information 243, the data #1 is written, which is the same as the data stored in the data storage unit 110.

After the processing of S50 has been performed, the status of the synchronization flag 142 is set to "desynchronized" in the storage node 100. The last writing information 143 indicates offset=X1 and size=Y1 which have been specified by the writing request in S47. In the storage area in the data storage unit 110, which is specified by the last writing information 143, data #2 specified by the writing request in S47 is not written and the data #1 is stored. In the storage node 200, the synchronization flag 242 has no value. The last writing information 243 indicates offset=X1 and size=Y1 which are the same as those indicated by the last writing information 143. In the storage area in the data storage unit 210, which is specified by the last writing information 243, the data #2 specified by the writing request in S47 is stored.

Thus, in a case where a response from the storage node 200 does not reach the storage node 100, data consistency may be lost.

Figure 10:
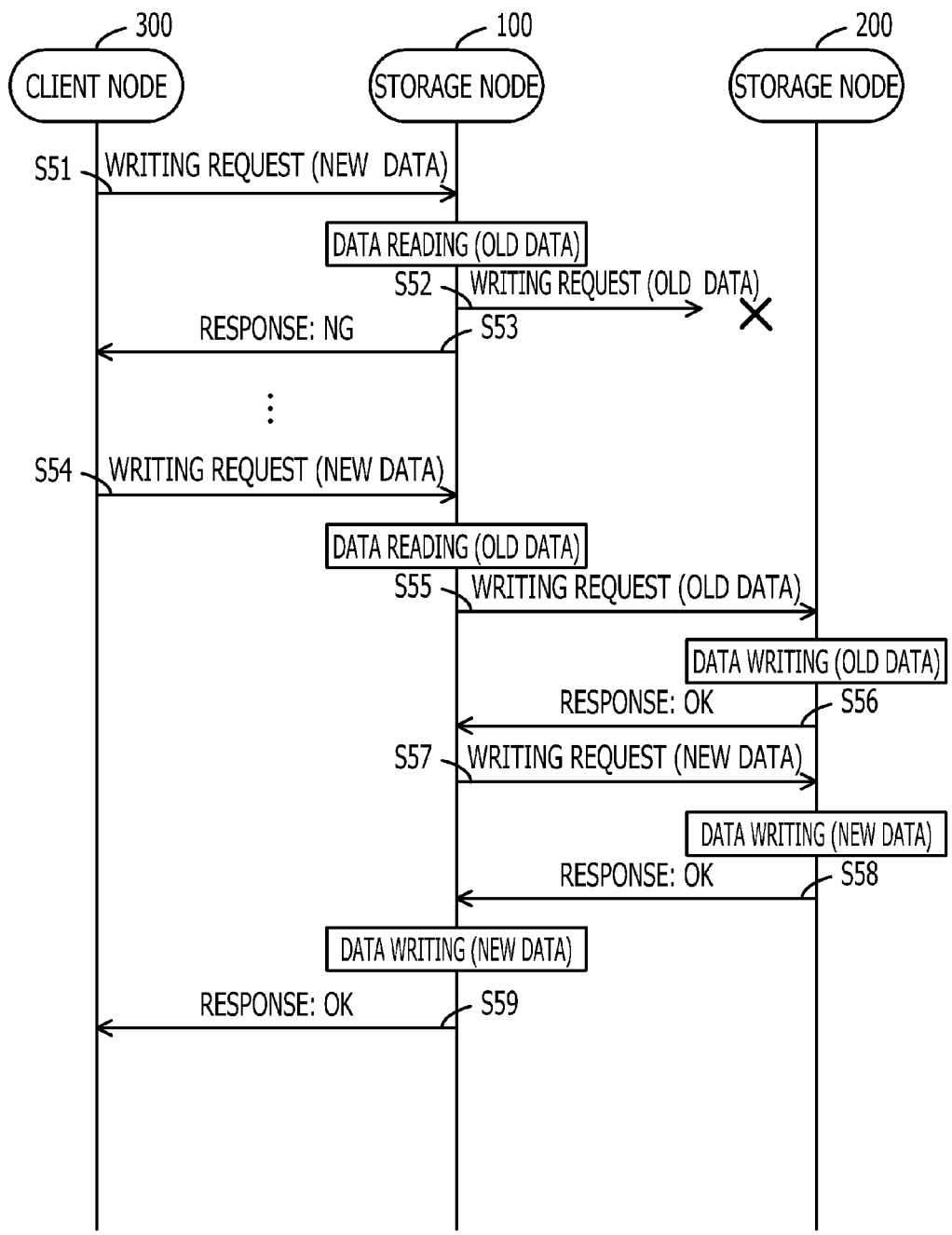
FIG. 10 is a diagram illustrating an exemplary sequence of data access.

FIG. 10 is a diagram illustrating an exemplary sequence of data access. This sequence is assumed to be continued from the sequence illustrated in FIG. 8.

(S51) The client node 300 transmits a writing request including information on an offset and a size for specifying a storage area to the storage node 100.

(S52) The storage node 100 checks that the status of the synchronization flag 142 is set to "desynchronized" and reads out data from a storage area in the data storage unit 110, which is specified by the last writing information 143. The storage node 100 transmits another writing request specifying the read data and the storage area specified by the last writing information 143 to the storage node 200. However, since the network 30 has not yet been recovered, the other writing request does not reach the storage node 200.

(S53) The storage node 100 detects the occurrence of a response timeout, maintains the status of the synchronization flag 142 in "desynchronized", and transmits a response indicating that the writing requested in S51 has failed to the client node 300.

(S54) The client node 300 transmits a writing request including information on an offset and a size for specifying a storage area to the storage node 100.

(S55) The storage node 100 checks that the status of the synchronization flag 142 is set to "desynchronized" and reads out data from the storage area in the data storage unit 110, which is specified by the last writing information 143. The storage node 100 transmits another writing request specifying the read data and the storage area specified by the last writing information 143 to the storage node 200.

(S56) The storage node 200 writes the data into the storage area in the data storage unit 210, which is specified by the other writing request. The storage node 200 checks that writing has been successfully performed, and transmits a response indicating the success of the writing to the storage node 100.

(S57) The storage node 100 writes the last writing information 143 representing the storage area specified by the writing request obtained in S54 into the control information storage unit 140 and transfers the writing request obtained in S54 to the storage node 200.

(S58) The storage node 200 writes the last writing information 243 representing the storage area specified by the writing request into the control information storage unit 240, and writes data into the storage area in the data storage unit 210, which is specified by the writing request. The storage node 200 checks that writing has been successfully performed, and transmits a response indicating the success of the writing to the storage node 100.

(S59) The storage node 100 sets the status of the synchronization flag 142 to "synchronized", writes data into the storage area in the data storage unit 110, which is specified by the writing request obtained in S54, and transmits a response indicating the success of the writing request obtained in S54 to the client node 300.

Figure 11:
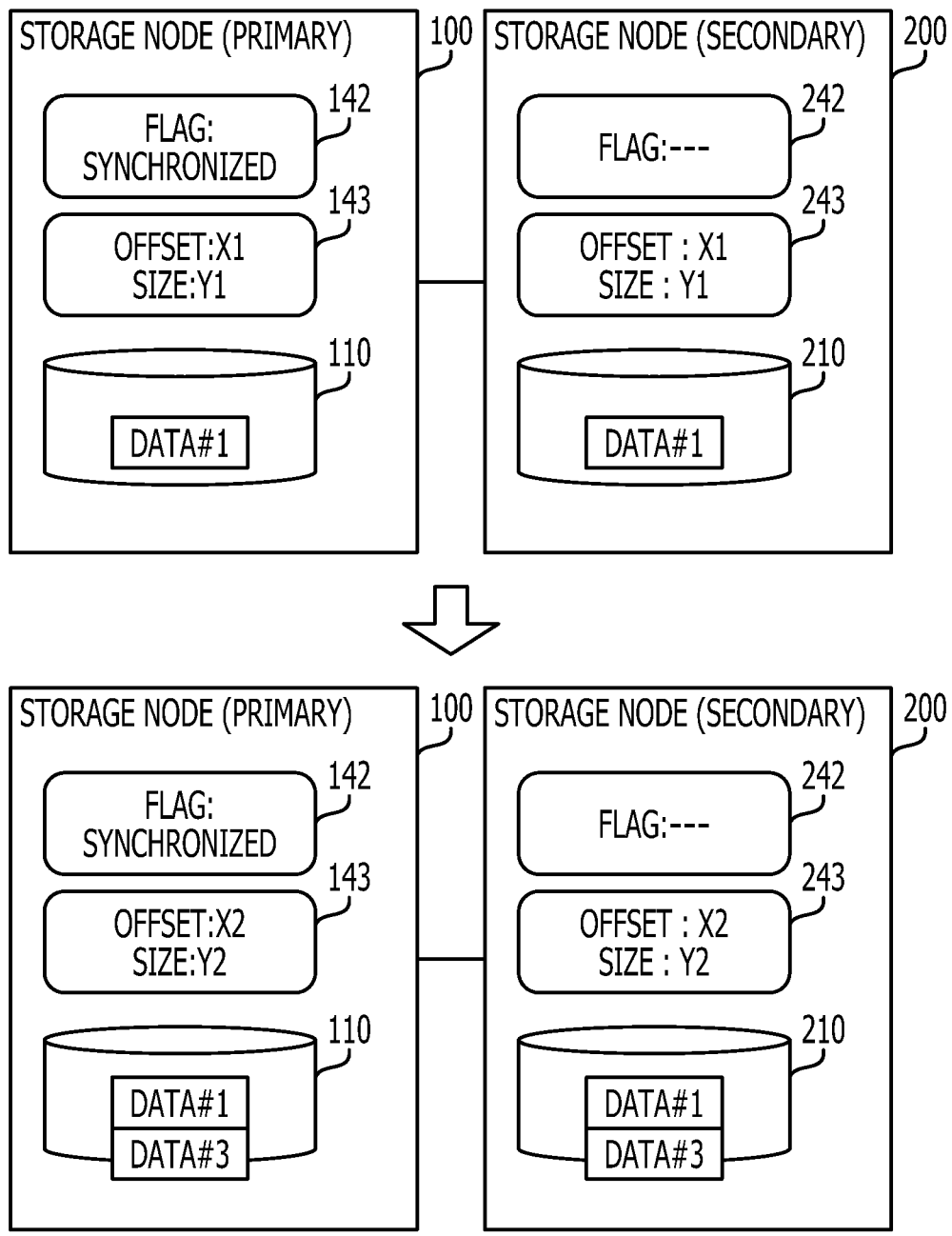
FIG. 11 is a diagram illustrating a second example of change in synchronization state.

FIG. 11 is a diagram illustrating a second example of change in synchronization state. The upper part of FIG. 11 represents the states of the storage nodes 100 and 200 after the processing of S56 has been performed. The lower part of FIG. 11 represents the states of the storage nodes 100 and 200 after the processing of S59 has been performed.

After the processing of S56 has been performed, the status of the synchronization flag 142 is set to "synchronized" in the storage node 100. The last writing information 143 indicates offset=X1 and size=Y1 specified by the writing request for which the status of the synchronization flag 142 has been set to "desynchronized". In the storage area in the data storage unit 110, which is specified by the last writing information 143, the data #1 is written. In the storage node 200, the synchronization flag 242 has no value. The last writing information 243 indicates offset=X1 and size=Y1 which are the same as those indicated by the last writing information 143. In the storage area in the data storage unit 210, which is specified by the last writing information 243, the data #1 is written, which has been copied from the data storage unit 110.

After the processing of S59 has been performed, the status of the synchronization flag 142 is set to "synchronized" in the storage node 100. The last writing information 143 indicates offset=X2 and size=Y2 which have been specified by the writing request obtained in S54. In the storage area in the data storage unit 110, which is specified by the last writing information 143, data #3 specified by the writing request obtained in S54 is written. In the storage node 200, the synchronization flag 242 has no value. The last writing information 243 indicates offset=X2 and size=Y2 which are the same as those indicated by the last writing information 143. In the storage area in the data storage unit 210, which is specified by the last writing information 243, the data #3 is written, which is the same as the data stored in the data storage unit 110.

Thus, upon receiving the next access in a state in which the status of the synchronization flag 142 is set to "desynchronized", the storage node 100 synchronizes the data storage unit 210 with the data storage unit 110. In a case where the network 30 has not yet been recovered and the synchronization between the data storage units 110 and 210 has failed, the storage node 100 performs the synchronization process again when receiving the further next access.

Figure 12:
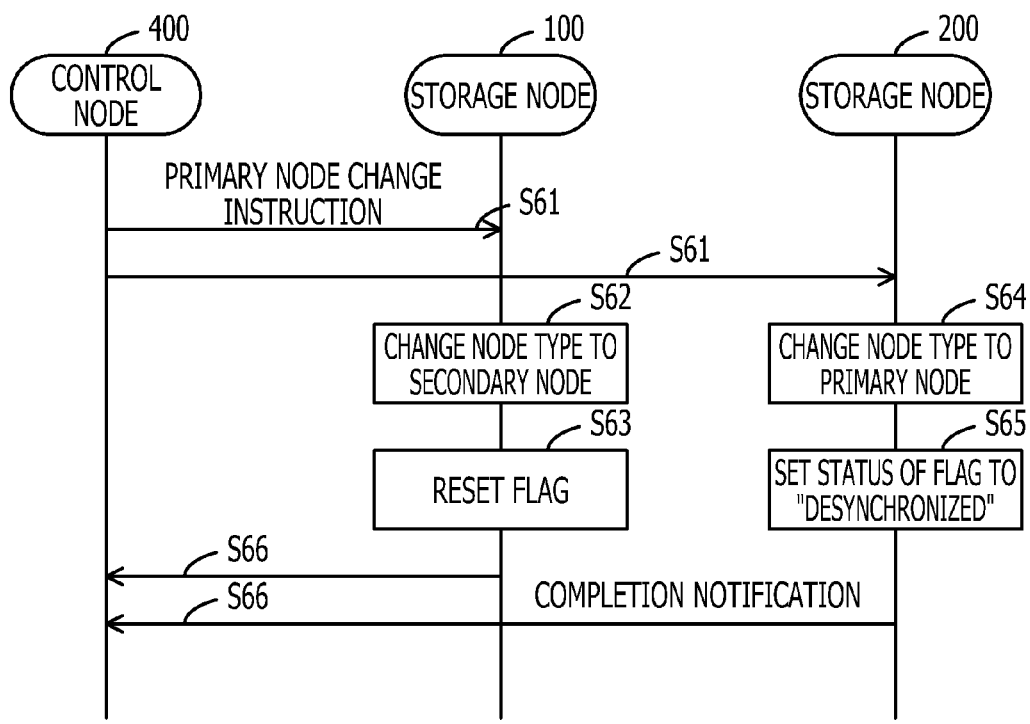
FIG. 12 is a diagram illustrating an exemplary sequence of node setting change.

FIG. 12 is a diagram illustrating an exemplary sequence of node setting change. The sequence illustrated in FIG. 12 will be described below. In the example illustrated in FIG. 12, the storage node 100 is changed from the primary node to the secondary node and the storage node 200 is changed from the secondary node to the primary node.

(S61) The control node 400 transmits a primary node change instruction to the storage nodes 100 and 200. For example, when the control node 400 receives a node exchange instruction input by a user or determines that a node exchange is preferably performed in accordance with a predetermined node exchange algorithm, it transmits the primary node change instruction.

(S62) The storage node 100 changes the node information 141 so as to change its node type from the primary node to the secondary node.

(S63) The storage node 100, which has changed its node type to the secondary node, resets the synchronization flag 142 (deletes the synchronization flag 142 from the control information storage unit 140), so that the synchronization flag 142 has no value.

(S64) The storage node 200 changes the node information 241 so as to change its node type from the secondary node to the primary node.

(S65) The storage node 200, which has changed its node type to the primary node, sets the status of the synchronization flag 242 to "desynchronized".

(S66) The storage nodes 100 and 200 notify the control node 400 that the node setting change has been completed. Pieces of processing of the storage node 100 and pieces of processing of the storage node 200 (S62 to S65) may be performed in an arbitrary order.

Figure 13:
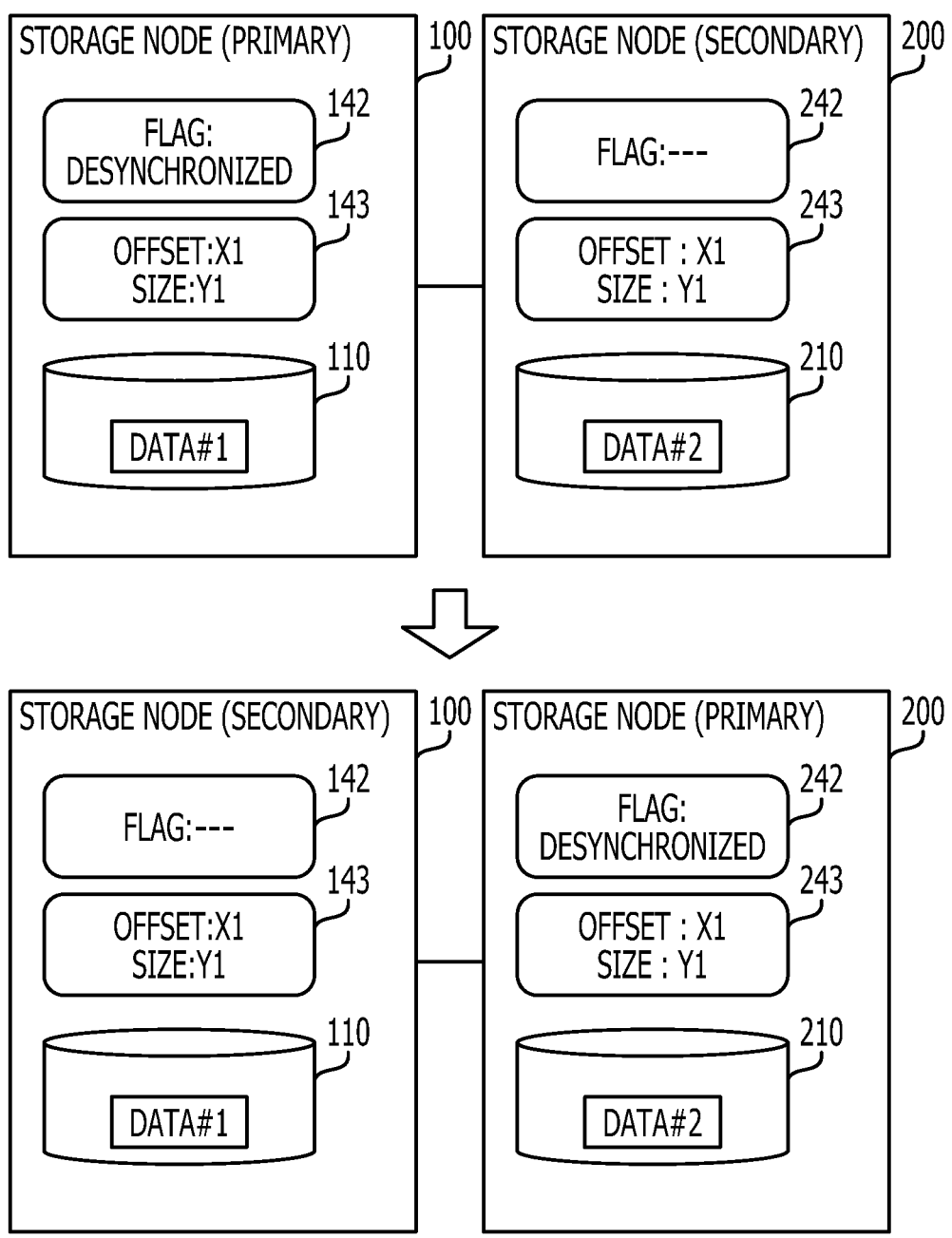
FIG. 13 is a diagram illustrating a third example of change in synchronization state.

FIG. 13 is a diagram illustrating a third example of change in synchronization state. A case in which a primary node change is performed when the storage node 100 is the primary node and data consistency is lost will be considered. The upper part of FIG. 13 represents the states of the storage nodes 100 and 200 in which data consistency is lost, for example, after the processing of S50 has been performed. The lower part of FIG. 13 represents the states of the storage nodes 100 and 200 after the processing of S66 has been performed.

As described previously, after the processing of S50 has been performed, the status of the synchronization flag 142 is set to "desynchronized" in the storage node 100. The last writing information 143 indicates offset=X1 and size=Y1 which have been specified by the writing request. In the storage area in the data storage unit 110, which is specified by the last writing information 143, the data #2 specified by the writing request is not written and the data #1 is stored. In the storage node 200, the synchronization flag 242 has no value.

The last writing information 243 indicates offset=X1 and size=Y1 which are the same as those indicated by the last writing information 143. In the storage area in the data storage unit 210, which is specified by the last writing information 243, the data #2 specified by the writing request is stored.

After the processing of S66 has been performed, the synchronization flag 142 is reset and has no value in the storage node 100. The last writing information 143 indicates offset=X1 and size=Y1 which are the same as those before the node exchange. In the storage area in the data storage unit 110, which is specified by the last writing information 143, the data #1 is stored, which is the same as that before the node exchange. In the storage node 200, the status of the synchronization flag 242 is set to "desynchronized". The last writing information 243 indicates offset=X1 and size=Y1 which are the same as those before the node exchange. In the storage area in the data storage unit 210, which is specified by the last writing information 243, the data #2 is stored, which is the same as that before the node exchange.

Thus, the status of the synchronization flag 242 of the storage node 200 that has changed its node type to the primary node is changed to "desynchronized". Accordingly, upon receiving the next access from the client node 300, the storage node 200 performs synchronization process. After the synchronization process has been performed, the data #1 stored in the secondary node (the storage node 100) is overwritten with the data #2 stored in the primary node (the storage node 200) and data consistency may be obtained again.

When the node exchange is performed, the new primary node (the former secondary node) does not know whether the synchronization flag of the former primary node is set to "desynchronized" (whether data consistency is lost). Accordingly, the new primary node performs the synchronization process after the node exchange. In the synchronization process after the node exchange, the data #2 stored in the former secondary node (the storage node 200) may be overwritten with the data #1 stored in the former primary node (the storage node 100).

With a storage system according to the second embodiment, even in a case where a response from the secondary node does not reach the primary node because of a network failure and data consistency is lost, the data consistency may be obtained again. As compared with a method of retransmitting data immediately after detecting the absence of a response from the secondary node, the method of causing the primary node to wait for the next access and perform synchronization process after receiving the next access raises the probability of success in performing synchronization after the network has been recovered. Furthermore, since the synchronization process is performed after the node exchange, data inconsistency does not continue.

Third Embodiment

Next, a third embodiment will be described focusing on the difference between the third embodiment and the second embodiment so as to avoid repeated description. A storage system according to the third embodiment periodically checks whether data consistency is lost regardless of the presence of data access.

Figure 14:
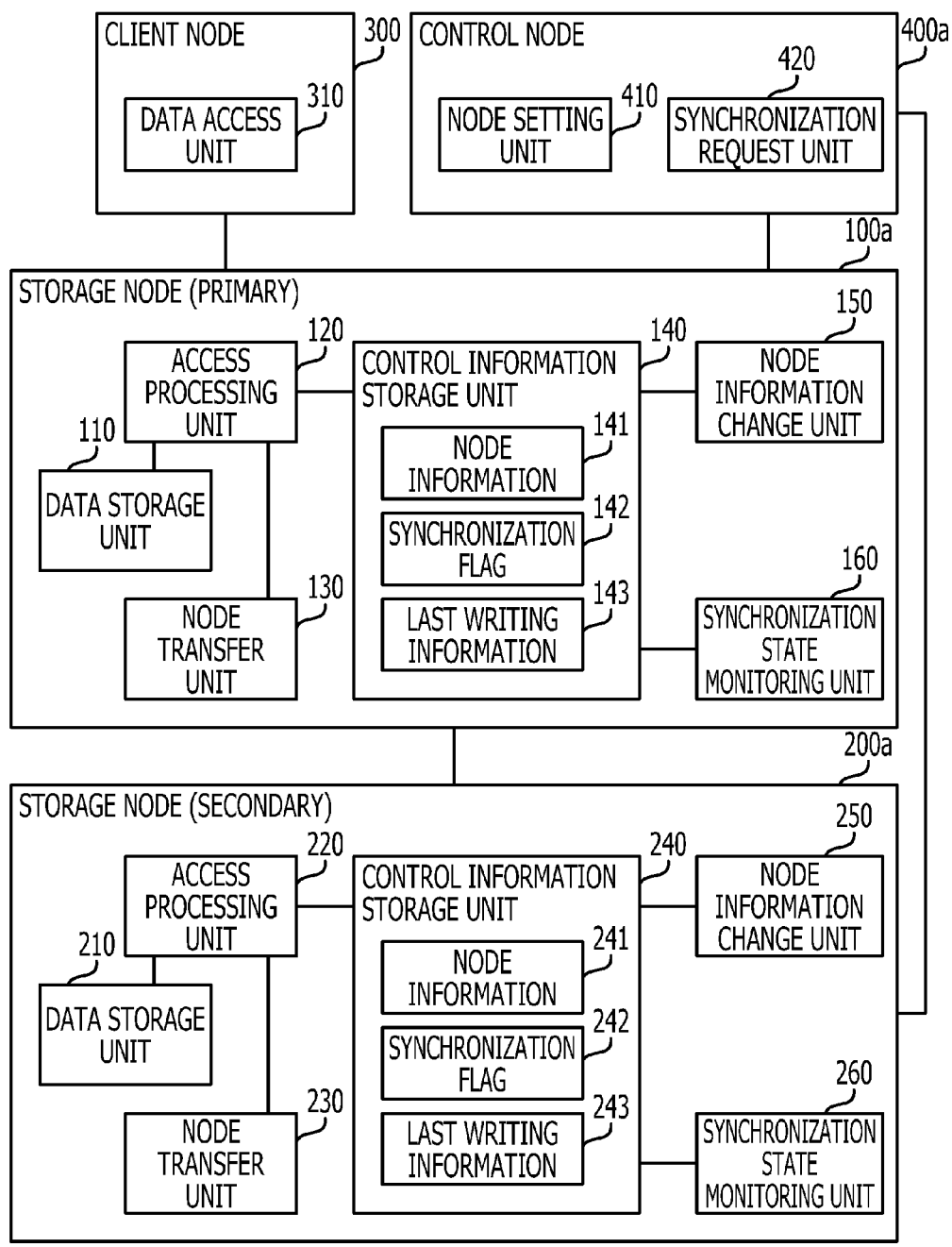
FIG. 14 is a diagram illustrating an example of a functional configuration of a storage system according to a third embodiment.

FIG. 14 is a diagram illustrating an example of a functional configuration of a storage system according to the third embodiment. The storage system according to the third embodiment includes storage nodes 100a and 200a, the client node 300, and a control node 400a.

The storage node 100a includes a synchronization state monitoring unit 160 in addition to the function modules included in the storage node 100 according to the second embodiment. Upon receiving a request from the control node 400a, the synchronization state monitoring unit 160 determines whether the status of the synchronization flag 142 is set to "desynchronized". In a case where the status of the synchronization flag 142 is set to "desynchronized", the synchronization state monitoring unit 160 instructs the node transfer unit 130 to perform synchronization process. In a case where the synchronization process has been successfully performed, the status of the synchronization flag 142 is set to "synchronized". Similarly, the storage node 200a includes a synchronization state monitoring unit 260 in addition to the function modules included in the storage node 200 according to the second embodiment.

The control node 400a includes a synchronization request unit 420 in addition to the function module included in the control node 400 according to the second embodiment. The synchronization request unit 420 transmits a synchronization request to one (for example the storage node 100a) of the storage nodes 100a and 200a which is set as the primary node in a predetermined cycle of, for example, a few minutes, several hours, or several days.

Figure 15:
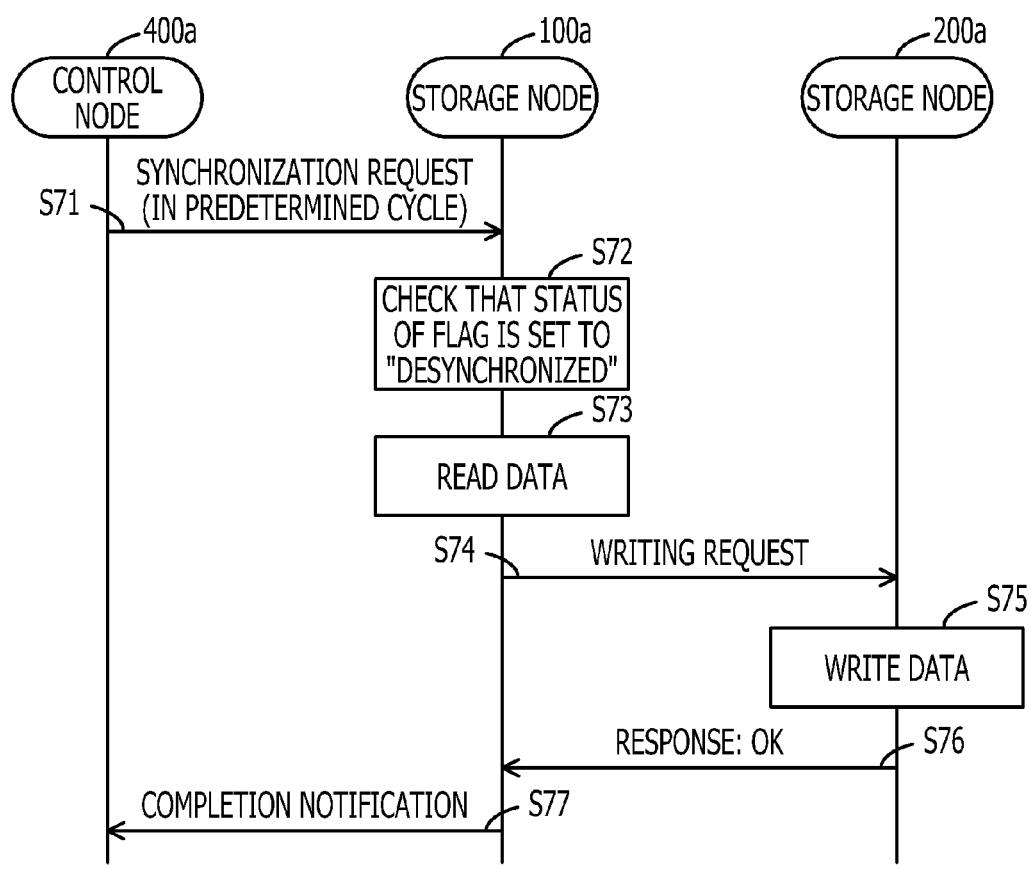
FIG. 15 is a diagram illustrating an exemplary sequence of synchronization patrol.

FIG. 15 is a diagram illustrating an exemplary sequence of synchronization patrol. The sequence illustrated in FIG. 15 will be described below under the assumption that the storage node 100a is the primary node.

(S71) The synchronization request unit 420 in the control node 400a transmits a synchronization request to the storage node 100a. The synchronization request is repeatedly transmitted in a predetermined cycle.

(S72) The synchronization state monitoring unit 160 in the storage node 100a checks that the status of the synchronization flag 142 is set to "desynchronized".

(S73) The node transfer unit 130 in the storage node 100a reads out data from the storage area in the data storage unit 110, which is specified by the last writing information 143.

(S74) The node transfer unit 130 in the storage node 100a transmits a writing request specifying the data read in S73 and the storage area specified by the last writing information 143 to the storage node 200a.

(S75) The access processing unit 220 in the storage node 200a writes the last writing information 243 representing the storage area specified by the writing request into the control information storage unit 240, and writes the data into the storage area in the data storage unit 210, which is specified by the writing request.

(S76) The access processing unit 220 in the storage node 200a transmits a response indicating the success of writing to the storage node 100a.

(S77) The synchronization state monitoring unit 160 in the storage node 100a sets the status of the synchronization flag 142 to "synchronized" and notifies the control node 400a of the completion of synchronization.

A synchronization method (synchronizing by patrol) according to the third embodiment and a synchronization method (synchronizing upon the reception of access) according to the second embodiment may be combined. For example, the synchronization process may be performed when the primary node receives a writing request, and may also be performed in a periodic cycle. Like a storage system according to the second embodiment, a storage system according to the third embodiment may recover data consistency.

Fourth Embodiment

Next, a fourth embodiment will be described focusing on the difference between the fourth embodiment and the second and third embodiments so as to avoid repeated description. In a storage system according to the fourth embodiment, the storage areas are divided into a plurality of segments. For each of the segments, one of a plurality of storage nodes may be selected as the primary node.

Figure 16:
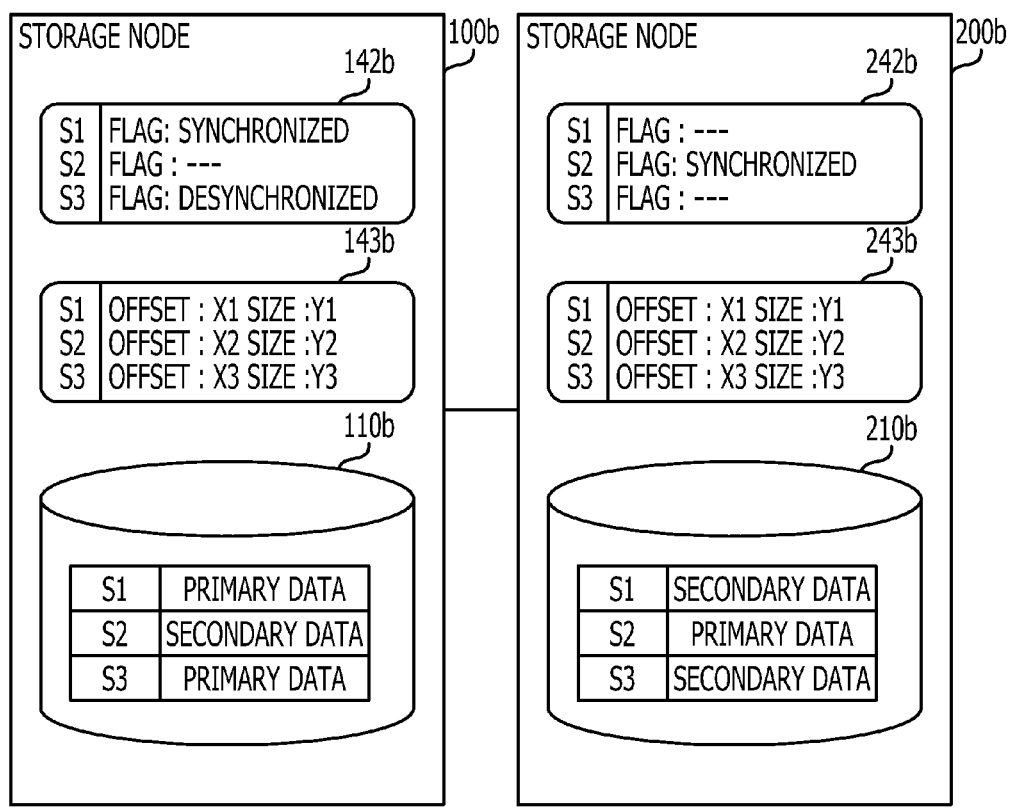
FIG. 16 is a diagram illustrating an example of a data structure according to a fourth embodiment.

FIG. 16 is a diagram illustrating an example of a data structure according to the fourth embodiment. A storage system according to the fourth embodiment includes storage nodes 100b and 200b. The storage node 100b includes a data storage unit 110b, and stores a synchronization flag 142b and last writing information 143b. The storage node 200b includes a data storage unit 210b, and stores a synchronization flag 242b and last writing information 243b.

Each of storage areas in the data storage units 110b and 210b is divided into a plurality of segments (logical block units). For example, each of the data storage units 110b and 210b includes segments S1, S2, and S3. Primary data for each of the segments S1 and S3 is stored in the data storage unit 110b, and secondary data for each of the segments S1 and S3 is stored in the data storage unit 210b. Primary data for the segment S2 is stored in the data storage unit 210b, and secondary data for the segment S2 is stored in the data storage unit 110b.

The client node 300 accesses a storage node in which primary data is to be stored. Accordingly, the storage node 100b operates as the primary node for the segments S1 and S3, and the storage node 200b operates as the primary node for the segment S2.

In the synchronization flags 142b and 242b, a status (synchronized or desynchronized) is set for each segment. The pieces of last writing information 143b and 243b include information on an offset and a size, for each segment. The storage node 100b performs the synchronization process described in the second and third embodiments on the segments S1 and S3 using the synchronization flag 142b and the last writing information 143b. The storage node 200b performs the synchronization process described in the second and third embodiments on the segment S2 using the synchronization flag 242b and the last writing information 243b. For example, upon receiving the next writing request for the segment S3, the storage node 100b performs the synchronization process on the segment S3.

Like a storage system according to the second embodiment, a storage system according to the fourth embodiment may recover data consistency. Furthermore, according to the fourth embodiment, accesses may be distributed among a plurality of storage nodes.

As described previously, a storage control method according to the second to fourth embodiments may be performed by causing the storage nodes 100, 100a, 100b, 200, 200a, and 200b, the client node 300, and the control nodes 400 and 400a, which are computers, to execute programs. The programs may be stored in a computer readable recording medium (for example the recording medium 33). The computer readable recording medium is, for example, a magnetic disk such as an FD or an HDD, an optical disc such as a CD, a CD-R (Recordable)/RW (Rewritable), a DVD, or a DVD-R/RW, an MO, or a semiconductor memory.

In a case where a program is put on the market, for example, portable recording media recording the program are provided. Alternatively, the program may be stored in a storage device in another computer and be distributed via the network 30. For example, a computer stores the program, which is recorded in a portable recording medium or is received from another computer, in a storage device (for example the HDD 103), reads out the program from the storage device, and executes the read program. However, the computer may directly execute the program read out from a portable recording medium or received from another computer via the network 30.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a first storage unit including a first storage area; and
a processor that
receives a first request to write first data into the first storage area,
requests an external apparatus to write the first data into a second storage area in a second storage unit included in the external apparatus, the second storage area corresponding to the first storage area,
determines whether a first response has been received from the external apparatus, the first response indicating that the first data has been written into the second storage area,
writes the first data into the first storage area when it is determined that the first response has been received from the external apparatus, and
requests, without writing the first data into the first storage area, the external apparatus to write second data stored in the first storage area into the second storage area when determining that the first response has not been received from the external apparatus.

2. The information processing apparatus according to claim 1, wherein
the processor requests the external apparatus to write the second data into the second storage area upon receiving a second request to write third data after it is determined that the first response has not been received from the external apparatus.

3. The information processing apparatus according to claim 1, wherein
the processor requests the external apparatus to write the second data into the second storage area at a timing in a predetermined cycle after it is determined that the first response has not been received from the external apparatus.

4. The information processing apparatus according to claim 1, wherein
the processor repeatedly requests the external apparatus to write the second data until the processor receives a second response from the external apparatus, the second response indicating that the second data has been written into the second storage area.

5. A storage control method executed by a first node included in a storage system, the first node including a first storage unit, the storage control method comprising:
receiving a first request to write first data into a first storage area in the first storage unit;
requesting a second node included in the storage system to write the first data into a second storage area in a second storage unit included in the second node, the second storage area corresponding to the first storage area;

determining whether a first response has been received from the second node, the first response indicating that the first data has been written into the second storage area;

writing, by the first node, the first data into the first storage area when it is determined that the first response has been received from the second node; and requesting, without writing the first data into the first storage area, the second node to write second data stored in the first storage area into the second storage area when determining that the first response has not been received from the second node.

6. A computer-readable recording medium storing a program that causes a computer included in a storage system to execute a storage control method, the computer including a first storage unit, the storage control method comprising:

receiving a first request to write first data into a first storage area in the first storage unit;

requesting an apparatus included in the storage system to write the first data into a second storage area in a second storage unit included in the apparatus, the second storage area corresponding to the first storage area;

determining whether a first response has been received from the apparatus, the first response indicating that the first data has been written into the second storage area;

writing the first data into the first storage area when it is determined that the first response has been received from the apparatus; and requesting, without writing the first data into the first storage area, the apparatus to write second data stored in the first storage area into the second storage area when determining that the first response has not been received from the apparatus.

* * * * *